(12) United States Patent
Guy et al.

(10) Patent No.: US 7,657,366 B2
(45) Date of Patent: Feb. 2, 2010

(54) METHOD OF INHIBITING THE AUTOMATIC STOP CONTROL SYSTEM OF THE HEAT ENGINE OF A VEHICLE IN THE ABSENCE OF A DRIVER

(75) Inventors: Jean-Emmanuel Guy, Le Chesnay (FR); Arnaud Celisse, Paris (FR); Herve Klein, Levallois Perret (FR); Guillaume Levasseur, Nanterre (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 409 days.

(21) Appl. No.: 11/574,401

(22) PCT Filed: Aug. 10, 2005

(86) PCT No.: PCT/FR2005/050668

§ 371 (c)(1), (2), (4) Date: Feb. 27, 2007

(87) PCT Pub. No.: WO2006/027514

PCT Pub. Date: Mar. 16, 2006

(65) Prior Publication Data

US 2007/0267238 A1    Nov. 22, 2007

(30) Foreign Application Priority Data

Aug. 27, 2004   (FR)   .................. 04 51918

(51) Int. Cl.
*G06F 19/00* (2006.01)
*B60K 28/04* (2006.01)

(52) U.S. Cl. ..................................... 701/112

(58) Field of Classification Search .......... 701/101, 701/102, 112, 113, 115, 2, 29, 35; 477/169, 477/181; 180/271–273, 289
See application file for complete search history.

(56) References Cited

U.S. PATENT DOCUMENTS

| | | | | |
|---|---|---|---|---|
| 4,381,042 A | | 4/1983 | Perry et al. | |
| 5,626,536 A | * | 5/1997 | Kono et al. | 477/181 |
| 5,793,189 A | * | 8/1998 | Kawaguchi et al. | 322/28 |
| 6,570,486 B1 | * | 5/2003 | Simon et al. | 340/5.1 |
| 6,922,622 B2 | * | 7/2005 | Dulin et al. | 701/45 |
| 2004/0093127 A1 | | 5/2004 | Onoyama et al. | |

FOREIGN PATENT DOCUMENTS

DE    10211463 B3    1/2004

(Continued)

OTHER PUBLICATIONS

International Search Report mailed Dec. 21, 2005 in PCT/FR2005/050668.

*Primary Examiner*—Hieu T Vo
(74) *Attorney, Agent, or Firm*—Nicolas E. Seckel

(57) ABSTRACT

A method of controlling the stopping and staffing of a heat engine (2) of a vehicle is such that (i) it is necessary for the vehicle to be in an engine stop request phase, and not in pre-defined operating conditions that oppose the stopping of the engine (2), in order for the engine (2) to be stopped or (ii) it is necessary for the vehicle to be in an engine staff request phase, and not in pre-defined operating conditions that oppose the staffing of the engine (2), in order for the engine to be started. For a given engine stop request phase, the engine (2) can only be stopped or staffed at most a pre-determined number of times.

11 Claims, 2 Drawing Sheets

FOREIGN PATENT DOCUMENTS

| | | |
|---|---|---|
| DE | 10 2007 009 856 A1 * | 9/2008 |
| EP | 0 595 712 A1 * | 5/1994 |
| EP | 0 959 435 A1 * | 11/1999 |
| EP | 1059442 A | 12/2000 |
| EP | 1416142 A | 5/2004 |
| FR | 2816891 A | 5/2002 |
| JP | 2000097067 A | 4/2000 |
| JP | 2005-2798 A * | 1/2005 |

\* cited by examiner

METHOD OF INHIBITING THE AUTOMATIC STOP CONTROL SYSTEM OF THE HEAT ENGINE OF A VEHICLE IN THE ABSENCE OF A DRIVER

The present invention concerns a method of controlling the automatic stopping and starting of a heat engine with which a motor or road vehicle is equipped.

The present invention concerns more particularly the non-authorization of the stopping or starting of the engine in the case the driver has left the vehicle.

Manufacturers of vehicles equipped with heat engines, such as motor or road vehicles, are always seeking technical solutions likely to reduce the consumption and the emissions of pollutants of these engines.

Among the various solutions developed to this day, a system has been proposed that triggers the automatic stopping of the engine in all the phases of use of the vehicle in which the operation of the engine is not necessary, such as the phases in which the vehicle is temporarily stopped and in which the engine keeps idling anyway, then performs the automatic starting of the engine when the driver wishes to have the vehicle start off again.

This solution of automatic stopping and starting of the engines, also called by Anglo -Saxons "Stop andStart" or "Stop and Go," has an important potential for reduction of the consumption of the engines because it is estimated that, on average, for a given journey, a vehicle is stopped with the engine in idle for about 20% of the time.

A "Stop and Start" system comprises generally a computer to control automatically the stopping and starting of the heat engine from appropriate information on the operation of the vehicle. This computer comprises notably means adapted to identify an engine stop request phase, means adapted to identify an engine stop authorization phase during which the stopping of the engine is actually possible, and means for performing the actual stopping of the engine if the conditions "vehicle in engine stop request phase" and "vehicle in engine stop authorization phase" are both met.

In the same manner, a "Stop and Start" system comprises notably means adapted to identify an engine start request phase, means adapted to identify an engine start authorization phase during which the starting of the engine is actually possible, and means for performing the actual starting of the engine if the conditions "vehicle in engine start request phase" and "vehicle in engine start authorization phase" are both met.

Any time period during which the driver indicates his or her desire to stop the engine of his or her vehicle is called "engine stop request phase," wherein the vehicle can be stopped or still moving. Such a desire to stop the engine can be characterized by various criteria, such as the operation of the brake pedal of the vehicle by the driver.

Any period during which the operation of the vehicle does not require the operation of the engine, and thus, authorizes its stopping, is called "engine stop authorization phase." The conditions of operation of the vehicle requiring the operation of the engine, and this, while the vehicle is in engine stop request phase, can concern the specific operation of an equipment of the vehicle as well as relate to the driving pleasure only. These conditions opposed to the stopping of the engine are characterized by various criteria such as, for example, the temperature of the engine cooling water lower than a predetermined threshold. Indeed, an engine must reach a certain temperature to operate in an optimal manner, so that it is not opportune to delay the temperature increase of the engine by stopping it too early after it has started.

Any time period during which the operation of the vehicle requires the starting of the engine is called "engine start request phase." The conditions of operation of the vehicle requiring such a start are inferred generally from the conditions opposed to the stopping of the engine.

Any period during which the operation of the engine does not prohibit the starting of the engine is called "engine start authorization phase." The conditions of operation opposed to a start can be linked, for example, to the opened or closed state of the clutch and/or to the state of the transmission, with a gear being engaged or not.

The document WO-98/14702 describes a "Stop and Start" system. This system comprises an electronic card that controls the stopping and starting of the heat engine from information supplied by two sensors:

a clutch pedal position sensor;
a hand brake position sensor.

If the clutch pedal is not pushed down and if the parking brake is actuated, then the engine is stopped automatically. If the clutch pedal is pushed down and if the parking brake is released, then the engine is restarted automatically.

This system also uses an engine speed sensor that deactivates the electronic card if the engine speed is higher than a certain threshold and an engine temperature sensor that also deactivates the electronic card if the engine has not reached its operating temperature.

Such a system actually makes it possible to reduce the consumption of the heat engine while minimizing the idling operating phases of the engine. However, the reduction in consumption generated by such a system does not seem particularly optimized.

Indeed, the engine stop request phases are here simply limited to the periods when the parking brake is actuated. Regarding the engine start authorization phases, they are defined only from a very limited number of operating conditions of the vehicle opposed to a stopping of the engine, i.e., the "cold engine" operating modes or the high engine speed operating modes.

Thus, with such a system, any stopping of the vehicle for which the parking brake is not actuated does not trigger any stopping of the engine, whereas this type of stopping represents a high proportion of the phases where the vehicle is stopped. Indeed, drivers rarely actuate the hand brake in a situation of temporary stopping, such as when stopping at street lights.

Further, the solution described in the document WO98/14702 is purely material. As a consequence, its complexity and notably that of its electronic card increases rapidly when the number of items of information taken into account to perform the automatic stopping of the engine increases.

The patent application FR-A-2 816 891 filed by the Applicant describes a more sophisticated "Stop and Start" system that remedies the drawbacks of the previous systems by creating a system that makes it possible to implement substantially higher-performance automatic engine stopping and starting strategies.

The system for controlling the automatic stopping and starting of a heat engine, object of the application FR-A-2816891 comprises means for stopping and starting the engine, sensors of information on the state of the vehicle, means for controlling said means for stopping and starting the engine from the information of the sensors, and is characterized in that these control means comprise an computer containing an algorithm for controlling said engine acting as a function of the data supplied by said information sensors.

This system makes it thus possible to take into account a larger number of vehicle operating situations requesting the stopping of the engine, and thus to improve the gain in consumption generated by a larger number of engine stops, while taking into account a larger number of operating conditions of the vehicle opposed to the stopping of the vehicle, and this, so as notably to limit the possible impacts of stopping of the engine on the operation of the vehicle and on the driving pleasure.

Such a system makes it thus possible to solve in a simple way problems that call for more complex engine control strategies taking into account an important number of operating conditions of the vehicle.

However, it has been observed that new improvements were still necessary to provide a higher security of operation of the system.

Indeed, in all the systems proposed to this day, the stopping of the engine is maintained when the driver leaves the vehicle. The vehicle is then unlocked, the ignition key remaining on the dashboard in its position +APC, and ready to re-start at the least actuation of the acceleration pedal and this without the driver having necessarily become conscious of the situation.

Such a situation can be dangerous notably regarding children likely to come seat at the wheel of the vehicle. This situation can also promote the theft of the vehicle.

A goal of the present invention is thus to improve further the method of controlling the automatic stopping and starting of an engine, by proposing a method for controlling the stopping and starting of an engine that provides a better security of operation notably with respect to situations where the driver is absent.

The method according to the invention concerns the control of the stopping and starting of a heat engine with which a vehicle is equipped, of the type according to which it is necessary that the vehicle be in an engine stop request phase and not in the predefined operating conditions opposed to the stopping of the engine for the stopping of the engine to be controlled, or in which it is necessary that the vehicle be in engine start request phase and not in the predefined operating conditions that are opposed to the starting of the engine for the starting of the engine to be controlled.

According to the invention, the method of controlling the stopping and starting of a heat engine is characterized in that the operating situations of the vehicle opposed to the stopping of the engine comprise the absence of the driver from the vehicle.

According to another characteristic of the control method object of the present invention, among the operating conditions of the engine defining an engine start request phase is the detection of an absence of the driver from the vehicle.

Thus, the re-starting of the engine subsequent to the driver having exited the passenger compartment results in alerting the latter who is then in position to leave or not his or her vehicle with the engine running, with full knowledge.

According to another characteristic of the control method object of the present invention, as soon as the duration of the absence of the driver exceeds a threshold value, the absence of the driver does not constitute any longer an operating condition opposed to the stopping of the engine and the stopping of the engine can be controlled.

According to another characteristic of the control method object of the present invention, as soon as the duration of the absence of the driver exceeds a threshold value, the absence of the driver constitutes an operating condition opposed to the starting of the engine and the starting of the engine can no longer be controlled.

According to another characteristic of the control method object of the present invention, the absence of the driver is inferred from the position of the brake pedal.

According to another characteristic of the control method object of the present invention, the absence of the driver is inferred from the detection of an opening of the driver's door.

According to another characteristic of the control method object of the present invention, the absence of the driver is inferred from the detection of the unfastening of the driver's seat belt.

According to another characteristic of the control method object of the present invention, the absence of the driver is inferred from the detection of a lightening detected by a sensor with which the driver's seat is equipped.

According to another characteristic of the control method object of the present invention, the absence of the driver is inferred from information supplied by a specific driver presence sensor with which the vehicle is equipped.

According to another characteristic of the control method object of the present invention, the operation of the engine according to a start subsequent to the detection of the absence of the driver is performed during a predetermined time period, then the engine is stopped if, at the end of this time period, the driver is still detected to be absent.

According to another characteristic of the control method object of the present invention, once the engine has been stopped, it can no longer be re-started except if a predetermined code is entered.

According to another characteristic of the control method object of the present invention, the re-starting subsequent to the detection of the absence of the driver is accompanied by the triggering of sound and/or light warning signals intended to alert the driver.

The invention will be better understood by reading the following description, given by way of example only and made in reference to the annexed drawings in which.

Figure 1:
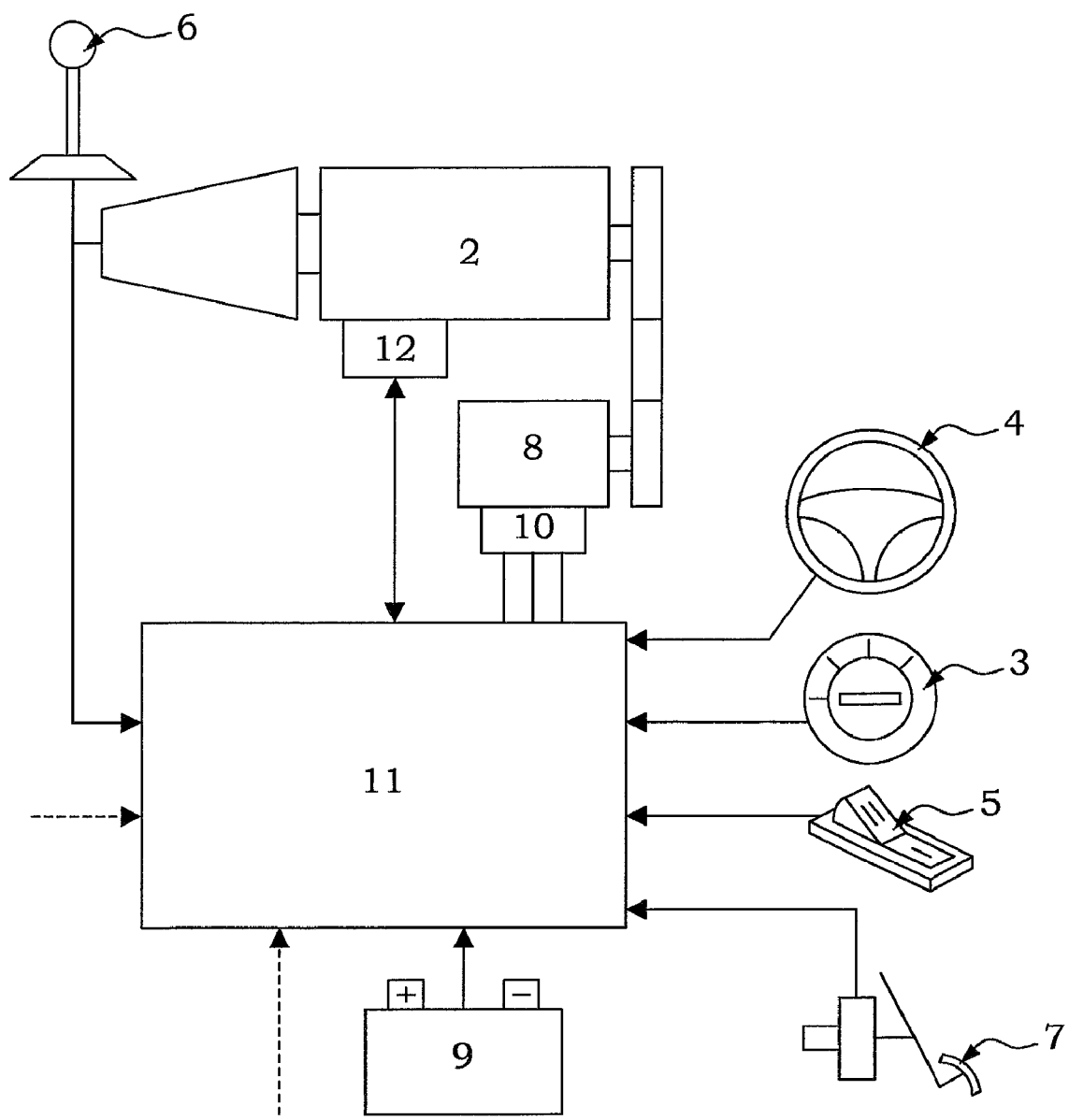
FIG. 1 is a view of a material architecture of the whole system for implementing the method according to the invention.

FIG. 1 shows various organs of a motor vehicle 1 equipped with a heat engine 2. In the passenger compartment of the vehicle, a switch 3 (with or without a key), disposed in the vicinity of the steering wheel 4, controls manually the starting and stopping of the engine 2, whereas means, such as a two-position switch 5 of the push button type, makes it possible for the driver to activate or inhibit the operation of the vehicle in the "Stop and Start" mode, i.e., in the automatic stopping and starting mode of the engine 2.

The vehicle comprises further a transmission mechanism whose gear lever 6 is shown, as well as a braking device controlled notably by a brake pedal 7.

Of course, these equipments are not limitative of the other equipments of the vehicle which have not been shown, such as, in particular, a clutch, an engine cooling fan system to cool the engine 2, an air conditioning device to cool/heat the passenger compartment, a power steering mechanism, etc.

The heat engine 2 is a standard engine of the multi-cylinder type with controlled ignition or compression ignition (diesel). These types of engines are well known and will not be described in further details. The operation of the engine 2 is controlled in a standard manner by an engine control computer 12 that drives notably the fuel flow rate.

The engine 2 cooperates with appropriate starting means such as a reversible rotating electric machine 8 forming alternator-starter. A transmission of movement, for example, via pulleys and belt, connects the rotor of the alternator-starter 8 to the crankshaft of the engine 2.

In a variant embodiment, the engine 2 can also cooperate with an additional starter, not shown, distinct from the alternator-starter 8.

The machine 8 makes it possible to transform a rotating movement of the inductor rotor, driven by the heat engine 2 of the vehicle, into an electric current induced in the coil windings of the stator. This current is then intended to supply electricity to the on-board network of the vehicle and to load the battery 9 of this vehicle.

The machine 8 can also constitute an electric motor or rotating electric machine and drive in rotation, via the rotor shaft, the heat engine 2 of the vehicle. Thus, the alternator-starter 8 can start the heat engine 2 of the motor vehicle.

This machine 8, for example, of the polyphase type, operates thus as an alternator, notably to load the battery of the vehicle, and as a starter, to drive the internal combustion engine, also called heat engine, of the motor vehicle so as to start it. To this effect, a power unit connected to the phases of the armature of the alternator is used as a control bridge of these phases in motor mode and serves as a rectifier bridge when the alternator-starter 8 operates in alternator mode.

Such a machine 8 is well known in itself and will not be described in further details. The document FR2842041, for example, describes such a machine.

The system implementing the method for automatically controlling the stopping and starting of the engine according to the invention comprises a computer 11 that drives, via the computers 10 and 12, the operation of the machine 8 and the stopping and starting of the engine 2, and this, from a certain number of items of information concerning the operation of the vehicle.

Indeed, the computer 11 cooperates with appropriate information sensors adapted to supply, in addition to the position of the switch 3 or of the button 5, the required information on the operation of the vehicle, such as the rotation speed of the engine 2, the speed of the vehicle, the distance covered, the position of the clutch pedal, the position of the accelerator pedal, the position of the gear lever 6, the position of the brake pedal 7 and that of the hand brake, the gear set in the gear box, the temperature of the engine cooling water, the loading state of the battery 9, the state of the air conditioning, the torque applied to the steering wheel by the driver, etc.

The computer 11 according to the invention has the logical information "driver presence" (and consequently "driver absence") supplied by appropriate means not shown. These means can be a sensor of the opening of the driver's door or a sensor of the unfastening of the driver's seat belt or a weight sensor with which the driver's seat is equipped, or else any specific driver presence sensor with which the vehicle is equipped. The computer 11 is sensitive, not only to the value of the information, but also to its transition from one state to the other, transition that indicates that the driver is leaving or arriving.

According to a particular embodiment of the invention, the driver is declared to be present when the following conditions are observed: the brake pedal is pushed down or else if the driver's seat belt is fastened and the driver's door is closed. So that the driver is declared to be absent if: the brake pedal is not pushed down and the driver's seat belt is unfastened or the driver's door is opened.

It is important to notice that the computer 11 according to the present invention is defined in a more general way as being any system in which a control algorithm can be implanted using programming means and containing at least a memory. A programmable logic array of the ASIC type could be used. This computer 11 can be specific as illustrated or it can be integrated into another computer, such as, for example, the computers 10 or 12, or it can be integrated into several computers.

The computer 11 performs a constant monitoring of the operation of the vehicle from a certain number of items of information transmitted directly by appropriate sensors or via other computers to which the computer 11 is connected, and when the engine is rotating, it checks whether the vehicle is or is not in engine stop request phase and in engine stop authorization phase, and it infers therefrom the stopping of the engine. In the same manner, the engine being stopped, the computer 11 checks from the information received whether the vehicle is or is not in start request phase and in engine start authorization phase, and infers therefrom the starting of the engine.

The engine stop request phases are defined by appropriate vehicle operating criteria combining the fact that the button 5 is in "not inhibited" position and that notably one of the following criteria is observed:

the position of the brake pedal goes from "not pushed" to "pushed";

the gear lever is in neutral.

With respect to the engine start authorization phases, they are defined from a certain number of criteria identifying predefined vehicle operating conditions opposed to the stopping of the engine 2.

Different types of vehicle operating conditions likely to define these authorization phases can be distinguished:

conditions linked to the vehicle itself, such as the needs of the engine (water temperature, etc.), the needs for braking assistance, the needs of the on-board electrical network, the passenger compartment heating needs, etc.;

conditions linked to the driving pleasure, such as parking maneuvers, etc.;

conditions linked to the driver.

With respect to the start request phases, they are inferred substantially from the conditions opposed to the stopping of the engine.

Turning to the conditions opposed to the start requests, they comprise notably situations linked to the transmission, such as the existence of a gear being engaged.

Figure 2:
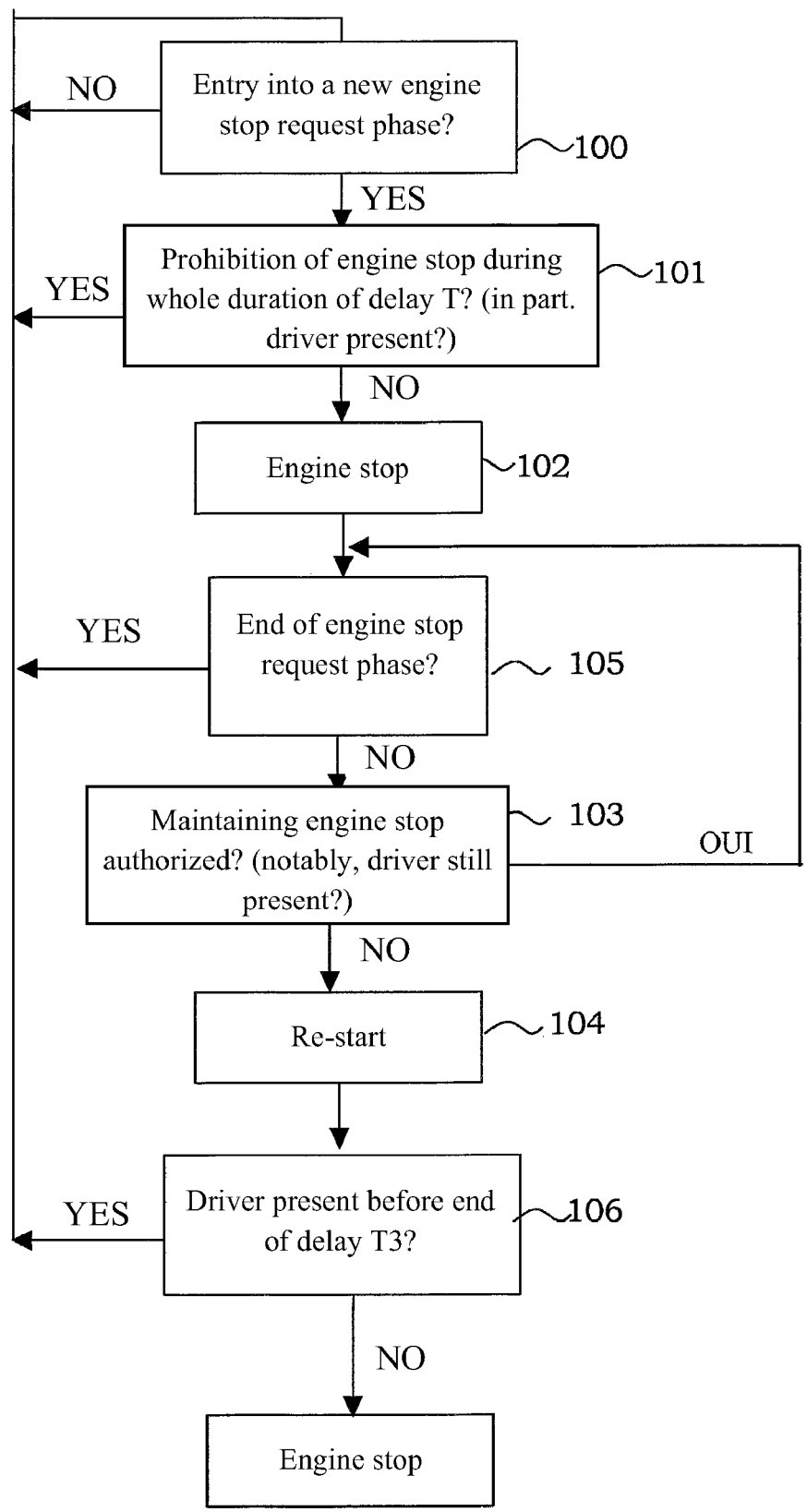
FIG. 2 is a schematic flow chart of the method according to the invention.

FIG. 2 shows an example of a control algorithm implementing the method according to the invention and contained in the electronic memories of the computer 11.

It is to be noted that the software architecture used to code the algorithm can be decomposed into two modules.

A first module, called low-level software, groups the controls relative to the material architecture used, such as the reading of a signal at one of the inputs of the microcontroller or the emission of an output signal. This low-level software is specific to the microcontroller used. The second module, called high-level software, is specific to the application implemented.

In the present invention, the second module is used to implant the management strategy of the automatic starting and stopping of the engine. It is performed in a programming language such as C.

Once the engine has been started and in the case where the switch 4 is in a position in which the automatic stop function of the engine is activated, the computer 11 checks regularly the operating state of the engine from the collected information, and thus performs the steps below in an iterative way.

During the test step 100, the computer 11 checks whether the vehicle has entered a new engine stop request phase.

A stop request phase is identified, for example, if the driver pushes on the brake pedal and/or has shifted gears to neutral (gear lever in neutral position or in neutral) and if the button 5 is in activated or "not inhibited" position.

When a new engine stop request phase has been identified and during the whole time period that this stop request phase will last, i.e., the whole time period when the driver keeps his or her foot pushed on the brake pedal and/or keeps the gears in neutral and the button 5 is in activation position, the computer then checks whether the vehicle is or is not in engine stop authorization phase, and this during step 101.

Indeed, the actual stopping of the engine is controlled only if the operating conditions of the vehicle allow it, i.e., if the vehicle is not in any one of the predetermined conditions for which the stopping of the engine is not authorized.

The conditions that do not authorize the stopping of the engine are thus tested one by one during the step 101. The step 101 thus consists in a series of distinct tests, each capable of characterizing an operation of the vehicle for which the stopping of the engine is not authorized. Among the operating conditions of the vehicle opposed to the stopping of the engine is the absence of the driver (i.e., the non-presence of the driver). This condition is thus tested at the step 101.

If at least one of the operating conditions of the engine opposed to the stopping of the engine is verified, then the engine is not stopped, and the engine will not be stopped during the whole duration of the present vehicle stop request phase, even if the condition that initially does not authorize the stopping disappears before the end of this stop request phase. Thus, the process ends there and returns to step 100.

In the variant embodiment shown at FIG. 2, it will be possible also to authorize a stopping if the condition that does not initially authorize the stopping of the engine disappears before a time period or delay T counted from the entry into the vehicle stop phase has elapsed. This delay T calibrated as a function of the engine and of the engine concerned is generally comprised between two and ten seconds.

It is possible, as a variant embodiment, to decide to stop the engine anyway if the absence of the driver lasts beyond a threshold duration T1 and this, notably to preserve the fuel resources of the vehicle or else as a security measure. This calibrated time value T1 is generally comprised between five and twenty minutes.

Thus, an absence of the driver having a duration of more than T1 is no longer an operating condition of the vehicle opposed to the stopping of the engine.

If, on the contrary, the step 101 reveals that the vehicle is in none of the operating conditions of the vehicle opposed to the stopping of the engine, i.e., the engine is in engine stop request phase, then the engine is stopped at the step 102.

Subsequently, during a new test step 103, step that is reiterated until the end of the present engine stop request phase, itself determined at the test step 105, the computer checks the state of the vehicle and determines if the operating conditions of the vehicle still authorize maintaining the engine stopped or if, on the contrary, they define an engine start request phase.

Indeed, the actual stopping of the engine is maintained only if the operating conditions of the vehicle allow it, i.e., if the vehicle is not in one or the other of the predetermined conditions for which the starting of the engine is required. The conditions that require the starting of the engine are thus checked one by one at the step 103 in a manner similar to the step 101, further, the conditions that require the starting of the engine being substantially the same as those opposed to the stopping of the engine, they will not be described in more details.

If an operating condition requiring the starting of the engine occurs, and in particular, if the absence of the driver is detected and if no condition is opposed to this re-starting, then the latter is re-started at the step 104.

In the particular case of a driver absence condition, the re-starting of the engine 2 must be performed preferably immediately after the detection of the absence of the driver. Indeed, if the starting cannot occur quickly, i.e., before a time period T2 counted after the driver has left, it can be desirable for security reasons not to perform the starting. In this case, the absence of the driver for a duration of more than T2 becomes a condition opposed to the starting of the engine. This calibrated time value T2 is generally comprised between one and twenty minutes.

This immediate re-starting as soon as it has been detected that the driver has left, event characterized by the transition "driver presence"/"driver absence," is in position to inform fully the driver of the situation, because the latter is still in the passenger compartment or in the immediate vicinity of the vehicle and is thus sensitive to the starting of the heat engine.

It must be noted that, as a variant, it is possible, in addition to this engine re-starting, to perform specific sound or light warnings to alert the driver even better.

The engine thus started can be stopped after a predetermined time period or delay T3 if the driver does not come back and this, notably to preserve the fuel resources of the vehicle or else as a security measure. This calibrated time value T3 is generally comprised between one and twenty minutes. This condition is tested at the step 106.

It can also be programmed that the engine thus stopped cannot be re-started after a given time period only after a preliminary driver identification operation, such as, for example, entry of an appropriate secret code, and this, for example, from an appropriate manipulation of the driver controls, such as a predetermined alternation of pushing the acceleration and brake pedals.

Of course, the present invention is not limited to the particular embodiment described above, and thus, numerous changes or modifications can be made thereto without leaving the scope of the present invention.

The invention claimed is:

1. Method of controlling the stopping and starting of a heat engine with which a vehicle is equipped, comprising:
    stopping the engine when the engine is in engine stop request phase and not in predefined operating conditions opposed to a stopping of said engine, and
    starting the engine when the engine is in engine start request phase and not in predefined operating conditions opposed to starting of said engine,
    wherein said operating conditions of the engine opposed to the stopping of the engine comprise an absence of the driver from the vehicle, and
    among the engine operating conditions defining a start request phase is a detection of an absence of the driver from the vehicle.

2. Control method according to claim 1, wherein, as soon as the duration of the absence of the driver exceeds a first threshold value, the absence of the driver does not constitute any longer an operating condition opposed to the stopping of the engine and the stopping of the engine can be controlled.

3. Control method according to claim 1, wherein, as soon as the duration of the absence of the driver exceed a second threshold value, the absence of the driver constitutes an operating condition opposed to the starting of the engine and the staffing of the engine can no longer be controlled.

4. Control method according to claim 1, wherein the absence of the driver is inferred from the position of the brake pedal.

5. Control method according to claim 1, wherein the absence of the driver is inferred from the detection of an opening of the driver's door.

6. Control method according to claim 1, wherein the absence of the driver is inferred from the detection of the unfastening of the driver's seat belt.

7. Control method according to claim 1, wherein the absence of the driver is inferred from the detection of a lightening detected by a sensor with which the driver's seat is equipped.

8. Control method according to claim 1, wherein the absence of the driver is inferred from information supplied by a specific driver presence sensor with which the vehicle is equipped.

9. Control method according to claim 1, wherein the operation of the engine according to a start subsequent to the detection of the absence of the driver is performed during a predetermined time period, then the engine is stopped if, at the end of this time period, the driver is still detected to be absent.

10. Control method according to claim 9, wherein, once the engine has been stopped, it can no longer be re-staffed except if a predetermined code is entered.

11. Control method according to claim 1, wherein the re-starting subsequent to the detection of the absence of the driver is accompanied by the triggering of sound and/or light warning signals intended to alert the driver.

\* \* \* \* \*